US007781037B2

(12) United States Patent
Korson

(10) Patent No.: US 7,781,037 B2
(45) Date of Patent: Aug. 24, 2010

(54) SECURITY SEALS FOR CONTAINERS AND METHODS OF USING THE SAME FOR AUTHENTICATION

(75) Inventor: Robert M. Korson, Traverse City, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/230,154

(22) Filed: Sep. 19, 2005

(65) Prior Publication Data

US 2007/0065609 A1 Mar. 22, 2007

(51) Int. Cl.

| | |
|---|---|
| ***B32B 15/08*** | (2006.01) |
| ***B32B 9/00*** | (2006.01) |
| ***B65D 41/00*** | (2006.01) |
| ***B65D 53/00*** | (2006.01) |

(52) U.S. Cl. .................... 428/35.9; 428/34.7; 428/35.7; 428/411.1; 428/457; 428/689; 428/690; 215/250; 215/258; 215/316; 215/347; 215/349

(58) Field of Classification Search ................ 428/34.1, 428/34.8, 35.2, 35.3, 35.4, 35.7, 35.8, 35.9, 428/36.6, 36.7, 34.4, 34.6, 34.7, 411.1, 457, 428/688, 689, 690; 215/250, 251, 258, 316, 215/341, 347, 349, 350

See application file for complete search history.

(56) References Cited

U.S. PATENT DOCUMENTS

| | | | | |
|---|---|---|---|---|
| 4,652,395 | A | 3/1987 | Marcina et al. | |
| 4,778,999 | A | 10/1988 | Fisher | |
| 6,082,566 | A * | 7/2000 | Yousif et al. | 215/232 |
| 6,165,609 | A * | 12/2000 | Curatolo | 428/343 |
| 6,461,326 | B1 | 10/2002 | Yang et al. | |
| 6,647,649 | B2 * | 11/2003 | Hunt et al. | 40/326 |
| 6,866,926 | B1 | 3/2005 | Smelko et al. | |
| 2005/0189255 | A1 | 9/2005 | Safian | |

FOREIGN PATENT DOCUMENTS

| | | |
|---|---|---|
| EP | 1 254 765 | 11/2002 |
| GB | 2 338 678 | 12/1999 |
| WO | WO 02/02319 | 1/2002 |

* cited by examiner

*Primary Examiner*—Rena L Dye
*Assistant Examiner*—Walter B Aughenbaugh
(74) *Attorney, Agent, or Firm*—Day Pitney, LLP

(57) ABSTRACT

Disclosed are self-authenticating seals for containers in which the seals include a non-visible taggant correlated to a pre-determined indicia. Containers sealed with the sealing members as well as methods of authenticating containers that have been sealed with the sealing members are disclosed.

11 Claims, 1 Drawing Sheet

SECURITY SEALS FOR CONTAINERS AND METHODS OF USING THE SAME FOR AUTHENTICATION

FIELD OF THE INVENTION

The present invention relates to adhesive seals for sealing containers and more particularly to adhesive seals incorporating a non-visible taggant allowing for authentication of a pre-determined indicia associated with the seal.

BACKGROUND OF THE INVENTION

In the packaging industry, a common concern is the ability to quickly identify the source (e.g., the manufacturer) and contents of a packaged product. Typically, adhesive labels indicating the source and contents of the packaged product are adhered to the outside of the package (e.g., a container). The labels are provided with some written indicia and/or bar coding as to the source and the contents of the packaged product. Thus, the source and the contents of the packaged product can be ascertained without opening the package.

Unfortunately, adhesive labels on the outside of a package can detach over time especially after prolong exposure to environmental conditions. Environmental conditions such as excessive heat and/or moisture can result in the adhesive label delaminating from the exterior surface of the package. This results in a package having no indicia as to its source. Worse yet, with non-transparent packaging, there is no means of ascertaining the contents of the package without first opening the package.

Another concern of the packaging industry is fraud and counterfeiting, which results in the loss of billions of dollars annually. As such, one of the pressing issues is the security of products and transactions involving those products. In order to deter fraud and counterfeiting, a plethora of security devices have been implemented. An example of such security devices in widespread use are holograms, which have been incorporated into credit cards and other security documents (e.g., stock and bond certificates). Another example of security devices that has become popular, especially in retail, are radio-frequency identification (RFID) tags.

However, holograms and RFID's as well as other security devices have a drawback in that these devices are readily identifiable (i.e., are visible) by the end-user under normal magnification. As a result, the security devices due to their visibility may be circumvented by those intent on committing fraud and/or counterfeiting. For example, a RFID can be easily removed once its presence has been identified by an end-user.

Accordingly, there is a need in the art to provide packaging with a means of authentication that avoids the above-described problems associated with exterior labels typically used in current packaging technology. Likewise, there is a need in the art to provide a security device (i.e., a means of authentication) that is not readily identifiable and is not readily removable once it has been identified.

It is, therefore, an object of the present invention to provide a solution for authenticating a package and/or its contents that does not require the use of exterior labels or opening of the package. Likewise, it also an object of the present invention to provide a security device that is not readily identifiable by an end-user and is not readily removable from the packaging even if its presence has been identified.

SUMMARY OF THE INVENTION

In view of the above, the present invention provides a self-authenticating sealing member for a container, which allows for quick authentication of a pre-determined indicia. The sealing member of the invention includes at least one layer of polymeric material adapted to seal an opening in the container, and an adhesive disposed on one side of the at least one layer. The adhesive includes a non-visible taggant for authentication and is preferably heat-activated. In another embodiment, the adhesive is of the type that leaves a residue after removal from the container so that the container can be authenticated after opening.

Preferably, the non-visible taggant is a light emitting taggant such as a fluorescent compound or a phosphorescent compound. In another embodiment, the taggant emits light upon exposure to a wavelength in the infrared spectrum, in the ultraviolet spectrum or a combination thereof. In a preferred embodiment, the sealing member of the invention further includes a metal or metallized layer disposed on the side of the polymeric material opposite from the adhesive.

The present invention also provides a self-authenticating container and a method of authenticating the container. The self-authenticating container includes container walls defining an interior volume for receipt of a product where the container has an opening at one end providing access to the interior volume. Preferably, the interior volume includes a product. The container also includes a sealing member, as described above, disposed over the opening of the container. The method of authenticating the container includes: providing a container as described above in which the sealing member is either attached or has been removed; identifying the presence of the non-visible taggant by (i) impinging on the container light having a wavelength outside the visible spectrum of light thereby exposing the non-visible taggant in the adhesive, if present, or (ii) visually inspecting the container with the aid of a magnification device to identify the non-visible taggant in the adhesive, if present. Once the presence of the non-visible taggant has been identified, the method includes subsequently correlating the identified taggant to a pre-determined indicia thereby authenticating the container. In one embodiment, the container further includes a product disposed in the interior volume of the container. In another embodiment, the container omits the sealing member and the container has adhesive residue including the non-visible taggant disposed proximal to the opening of the container.

DETAILED DESCRIPTION OF THE INVENTION

Figure 1:
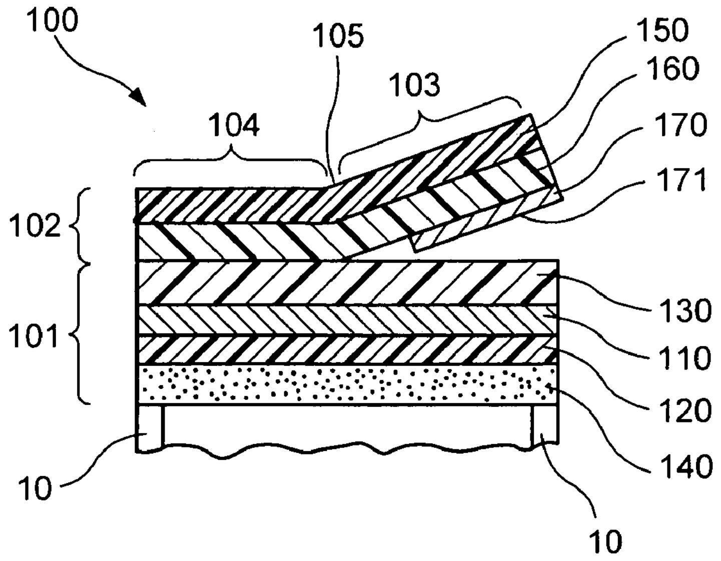
FIG. 1 is a cross-sectional view of a pull-tab sealing member to be used in accordance with the present invention.

The present invention provides a sealing member for a package that enables the package (sealed or unsealed) to be authenticated for a pre-determined indicia such as the source and/or contents of the package. The sealing member of the present invention includes at least one layer of polymeric material adapted to seal a mouth of a container where an adhesive, preferably heat-activated, is disposed on one side of the polymeric material. In accordance with the invention, the adhesive includes a non-visible taggant for authentication. The present invention also provides containers sealed with the sealing members of the invention that allow rapid authentication of pre-determined indicia associated with the container.

A "non-visible taggant" in this context means any chemical entity that is not visually discernable under normal magnification (i.e., by the naked eye in the wavelength spectrum of visible light) but is visually discernable upon either (i) exposure to a non-visible light source (i.e., light having a wavelength outside the visible spectrum) or (ii) magnification with an artificial means, or (iii) a combination thereof. An example of non-visible light includes light in the ultraviolet and infrared wavelengths.

In one preferred embodiment of the invention the non-visible taggant is a light-emitting (i.e., luminescent) taggant that emits light upon being impinged by light outside the visible wavelength spectrum (e.g., the ultraviolet and infrared spectrums). Luminescent compounds (e.g., fluorescent and phosphorescent compounds) are well known in the art and can be easily incorporated into an adhesive following the teachings of the invention. Representative classes of luminescent compounds to be used include, but are not limited to, dyes, pigments, quantum dots and any combination thereof. Luminescent compounds to be used in accordance with the invention preferably emit light in the visible wavelength so that authentication is achieved from just from a visual inspection of the seal. Although luminescent compounds that emit light outside the visible wavelength spectrum can also be used with detection equipment suitable for the wavelength to be detected.

Commercially available luminescent compounds include, but are not limited to, fluorescent dyes, optical brightners and pigments from DayGlo Color Corp., located in Cleveland, Ohio. Another source of luminescent compounds to be used in accordance with the invention is Ciba Specialty Chemicals Corp., located in Tarrytown, N.Y.

In another embodiment, the taggant is a non-luminescent taggant that is visible upon magnification with artificial means. For example, a magnification device to be used is a microscope, which can be portable or non-portable. Non-luminescent taggants are sometimes referred to as "microtaggants" and are generally in the form of microscopic polymeric particles that exhibit pre-determined patterns of colored bands discernable under visible light only with magnification of at least 30×. In a more preferred embodiment, the taggant is visible with at least 100× magnification. Optionally, the taggants can also include luminescent materials to provide an additional source of a pre-determined indicia. The above-described taggants are commercially available from MicroTrace, LLC located in Minneapolis, Minn.

Heat-activated adhesives for laminating sealing members to containers (such as bottles) are well-known in the art. Typically, the adhesive is a blend of various resins that forms a peelable seal after the adhesive is heat activated during sealing of the sealing member to the container. In a preferred embodiment, the heat-activated adhesive has a relatively stable bond strength after heat-activation in that the strength of the seal does not appreciably increase or decrease with the passage of time. In another preferred embodiment, the adhesive has a sufficiently low bond strength so that the adhesive seal delaminates upon removal of the sealing member. One particular advantage of the adhesive seal delaminating is adhesive residue remaining on the container (e.g., in the form of a white ring on the seal). The remaining residue allows the opened container to be authenticated for the pre-determined indicia due to presence of the taggant in the residue. Representative examples of commercially available resins include, but are not limited to, polyester resins (e.g., Vital® 3200B available from Bostik Inc., located in Wauwatosa, Wis.), rosin-esters resins (e.g., Stayelite® Ester 3 available from Hercules Inc., located in Wilmington, Del.), polyamide resins (e.g., P-2443 available from Lawter International located in Pleasant Prairie, Wis.), acrylic resins (e.g., Paraloid B-72 available from Rohm and Haas located Philadelphia, Pa.), and vinyl resins (e.g., VAGH available from Dow-Chemical located in Midland, Mich.).

The non-visible taggant is incorporated into the adhesive in an amount sufficient to discern or identify the presence of the taggant upon exposure to a non-visible light source or upon inspection with the aid of a magnification device (e.g., a microscope). When the taggant is a light-emitting compound, the amount of the taggant present in the adhesive is preferably sufficient to allow for visual identification of the taggant (i.e., identification by the naked eye rather than with the use of detecting instrumentation). Preferably, the amount of taggant present in the adhesive should be at least 0.1 weight percent of the total composition (wt. %), with at least 2 wt. % being more preferred, and at least 8 wt. % being even more preferred. However, excess amounts of taggant can also be detrimental in that the sealing properties of the adhesive may be negatively affected by large weight percents of taggant. The amount of the taggant should preferably be less than 40 wt. %, with less than 20 wt. % being more preferred. As will be apparent to one skilled in the art, the actual amount of the taggant required will depend on the selected taggant and the adhesive system that the taggant will be incorporated into. These parameters can be easily ascertained by those skilled in the art following the teachings of the invention.

Sealing members to be used in accordance with the invention are known in the art. The sealing member is primarily formed of at least one layer of polymeric material adapted to seal an opening (e.g., the mouth) of a container. The polymeric materials to be used preferably are heat-resistant and include polyolefins, polyethylene terephthalate, polyamides, and any combination thereof. Representative examples of polyolefins include, but are not limited to, polyethylene, polypropylene, copolymers with lower α-olefins and blends thereof. To facilitate heat-activation of the adhesive, the sealing member is preferably provided with a metal or metallized layer on the side of the polymeric material opposite from the adhesive layer. The metal or metallized layer allows sealing member to be sealed to the container using induction heating. One preferred metal is aluminum although other conductive metals such as copper can also be used.

Figure 2:
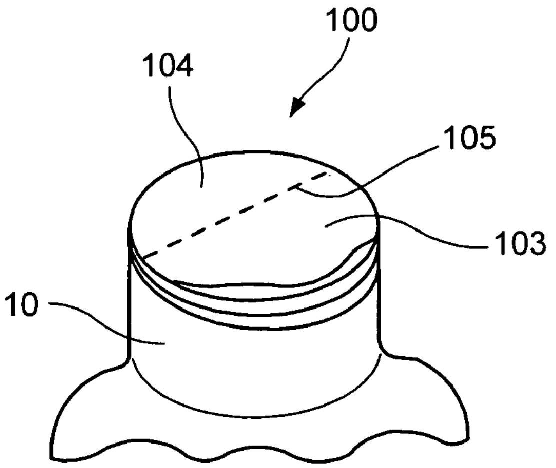
FIG. 2 is perspective view of the pull-tab sealing member of FIG. 1 disposed over the mouth of a bottle.

In a particularly preferred embodiment, the sealing member of the present invention is in form of a pull-tab sealing member such as those disclosed in commonly-assigned, U.S. Pat. No. 6,866,926, which is herein incorporated by reference. Referring to FIG. 1, pull-tab sealing member 100 is constructed from a bottom laminate sheet 101 and a top laminate sheet 102. Bottom sheet 101 includes a metal support layer 110 having a lower polymer layer 120 on the underside thereof and a polymeric foam layer 130 on the top surface of metal support layer 110. The bottom surface of lower sheet 101 is coated with sealant or adhesive 140. Top laminate sheet 102 is formed with a polymer support 150, which includes a polymer layer 160 on a bottom surface thereof. Top sheet 102 also includes a tab portion 103. Tab portion 103 is not adhered to bottom sheet 101 and can be folded up and away from bottom sheet 101 to provide a gripping tab for removing seal 100 from the top of container 10 (see also FIG. 2). Top sheet 102 also includes a joining portion 104 adhered to bottom sheet 101. A boundary 105 exists at the interface between tab portion 103 and joining portion 104 as shown in FIGS. 1 and 2. Boundary 105 advantageously extends in a straight line from edge to edge of seal 100 as shown in FIG. 2. The underside of tab 103 advantageously includes a release strip (tabbing strip) 170, preferably having a coat of release material 171 on the underside thereof.

In another embodiment, the present invention also provides a container sealed with the sealing member of the present invention. The container includes container walls defining an interior volume for receipt of a product where the container has an opening at one end providing access to the interior volume. The sealing member of the invention is disposed over (i.e., sealed to) the opening of the container by the adhesive (including taggant) being disposed between the at least one layer of polymeric material and the opening of the container. In a particularly preferred embodiment, the container is in the form of a bottle where the mouth of bottle is sealed with the sealing member of the present invention. A representative depiction of a bottle sealed in accordance with the invention is found in FIG. 2. FIG. 2 depicts container 10 (shown as a bottle) sealed with pull-tab sealing member 100 of commonly-assigned, U.S. Pat. No. 6,866,926. Pull-tab sealing member 100 is depicted with boundary line 105, which is the interface with tab portion 103 and joining portion 104. Upon grasping and pulling tab portion 104, sealing member 100 is removed from the mouth of bottle 10. In a preferred embodiment, the adhesive has an internal bond strength sufficiently low to causing shearing or delamination of the adhesive upon removal of sealing member 100. This results in adhesive residue remaining on the container, which can then be correlated to a pre-determined indicia thereby authenticating the bottle. In addition, the adhesive residue remaining on the container-seal provides the end user a visual indication (e.g., a white ring) that the container was previously sealed.

The present invention also provides a method of authenticating a container that has been sealed with the above-described sealing member. The method includes the following steps: (1) providing a container that has been sealed with the sealing member of the present invention; (2) identifying the presence of the non-visible taggant in the adhesive by either (i) impinging on the container a light having a wavelength outside the visible spectrum of light or (ii) visually inspecting the container with the aid of a magnification device; and (3) correlating the presence of the taggant to a pre-determined indicia thereby to authenticating the container. A "pre-determined indicia" in the context of the invention means any criteria by which the container should be authenticated for such as the source or the contents of the container. For example, a processed food manufacturer can provide a sealing member with a non-visible taggant that is correlated to a particular food stuff disposed within the interior of the container. A hypothetical example would be a non-visible taggant that fluoresces red that is previously correlated by the manufacturer to discern the container's contents being sunflower oil as compared to canola oil. This is particularly advantageous where a container is not transparent or where a particular food stuff can not be readily identified from a visual inspection of a transparent container. Although labels can rectify this problem, labels can delaminate from the container over time rendering identification of the contents of the container virtually impossible without opening the container. In another example, a processed food manufacturer provides a sealing member with a non-visible taggant correlated to the container's source (e.g., the food processing facility) so that the vendor and/or the manufacturer can quickly identify which facility the food stuff originated from. Accordingly, through the use of the present invention, any container that has been sealed with the sealing member of the invention can authenticated for a pre-determined indicia. Moreover, if a residue leaving adhesive is used, the container can be authenticated after removal of the pull-tab sealing member (i.e., the container now omits the sealing member).

The following non-limiting example further illustrates the advantageous use of a sealing member for a container incorporating an adhesive system with a non-visible taggant.

EXAMPLE

A polyester/rosin adhesive system was prepared incorporating a commercially available taggant, Stardust Z011. Stardust Z011 is commercially available from Stardust Technologies, Inc., located in Bellevue, Wash. Stardust Z011 is an inorganic-ceramic pigment/taggant that absorbs light in the infrared spectrum (in the range of 980 nm) and emits light in both the visible spectrum and in the infrared spectrum. The emission in visible spectrum is in the range of 550 nm, which corresponds to the color green. The emission in the infrared spectrum is in the range of 1,000 to 1,100 nm. The components of the adhesive formulation are listed in Table 1 set forth below.

TABLE 1

| | | | | | |
|---|---|---|---|---|---|
| Dry Wt: 71.35 LBS | % NV: 31.34% | | | Vol: 30.02 GAL | |
| Wet Wt: 227.62 LBS | CtWt: 2.70 g/m | Cov: 43012 ft | | 1-55 GAL DRUM(s) | |

| Material Description | Wet Wt | Dry Wt | %-Wet | %-Dry | Vol. |
|---|---|---|---|---|---|
| 25% Stayelite Ester 3 | 28.117 | 7.026 | 12.35 | 9.84 | 3.9219 |
| Vital 3200B 25% MEK | 61.862 | 15.459 | 27.17 | 21.66 | 8.4634 |
| Adcote 40-3 MEK 35% | 66.279 | 23.198 | 29.11 | 32.50 | 8.3780 |
| Adcote 76H5 Rohm & Haas | 70.297 | 24.604 | 30.88 | 34.47 | 9.2370 |
| Stardust Z011 | 1.070 | 1.070 | 0.47 | 1.49 | 0.0272 |

An inductive sealing member was coated with the adhesive formulation to provide a coating weight of 2.70 grams/meter$^2$. The sealing member had the following laminated structure: a top polymeric film layer formed from polyester; a foam layer laminated to the polymeric top layer; an aluminum foil layer (for induction heating) laminated to the foam layer opposite from the top polymeric film layer; a polymeric intermediate layer formed from polyester laminated to the aluminum foil layer opposite from the foam layer; and an adhesive layer including the taggant coated on the intermediate polymeric layer opposite from the aluminum layer. The sealing member also included a tab projection of the laminate structure to assist in removal of the sealing member from the container. The sealing member was sealed (i.e., laminated) to a container formed from polyester using inductive heating created by an electrical charge passing through the aluminum layer generating heat due to electrical resistance.

The sealed container was exposed to infrared light using a Stardust Technologies ST-5/2 detector. The presence of the taggant was identified by the visible observation of the color green emanating from the adhesive on the tab portion of sealing member. The presence of the taggant was also identified with use of the detector. Thus, two modes of identifying the presence of the taggant were utilized.

I claim:

1. A self-authenticating sealing member for a container, which comprises:

at least one layer of polymeric material adapted to seal an opening in the container;

a heat-activated adhesive disposed on one side of the at least one layer, wherein the adhesive includes a non-visible taggant for authentication, wherein the adhesive has a sufficiently low internal bond strength for delamination or shearing of the adhesive during removal of the seal thereby leaving a residue on the container to allow for authentication of the container; and an electrically conductive, metal layer for induction heating of the heat-activated adhesive, wherein the metal is disposed on the side of the polymeric material opposite from the adhesive.

2. The sealing member of claim 1, wherein the non-visible taggant is a light emitting taggant.

3. The sealing member of claim 2, wherein the taggant is a fluorescent compound.

4. The sealing member of claim 2, wherein the taggant is a phosphorescent compound.

5. The sealing member of claim 2, wherein the taggant emits light upon exposure to a wavelength selected from the group consisting of the infrared spectrum or the ultraviolet spectrum.

6. A self-authenticating container, which comprises:

container walls defining an interior volume for receipt of a product, the container having an opening at one end providing access to the interior volume; and a sealing member disposed over the opening of the container, wherein the sealing member comprises at least one layer of polymeric material adapted to seal the container, a heat-activated adhesive disposed between the at least one layer and the opening of the container, and an electrically conductive, metal layer for induction heating of the heat-activated adhesive, wherein the metal layer is disposed on the side of the polymeric material opposite from the adhesive, and wherein the adhesive includes a non-visible taggant for authentication and the adhesive has a sufficiently low internal bond strength for delamination or shearing of the adhesive during removal of the seal thereby leaving a residue on the container to allow for authentication of the container.

7. The container of claim 6, further comprising a product disposed in the interior volume of the container.

8. The container of claim 6, wherein the non-visible taggant is a light emitting taggant.

9. The container of claim 8, wherein the taggant is a fluorescent compound.

10. The container of claim 8, wherein the taggant is a phosphorescent compound.

11. The container of claim 8, wherein the taggant emits light upon exposure to a wavelength selected from the group consisting of the infrared spectrum or the ultraviolet spectrum.

* * * * *